June 20, 1950 P. D. VAN DER KNAAP 2,512,399
MIXING CIRCUIT
Filed May 7, 1948
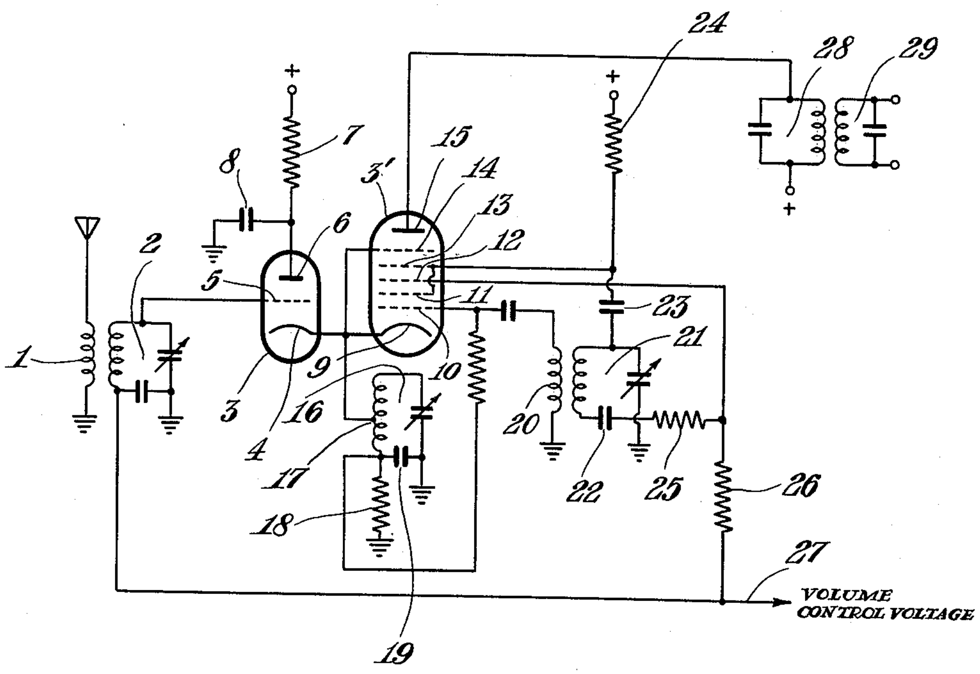
PIETER DANIEL VAN DER KNAAP
INVENTOR.
BY [signature]
AGENT.

Patented June 20, 1950

2,512,399

UNITED STATES PATENT OFFICE 2,512,399

MIXING CIRCUIT

Pieter Daniel van der Knaap, Eindhoven, Netherlands, assignor to Hartford National Bank and Trust Company, Hartford, Conn., as trustee Application May 7, 1948, Serial No. 25,702
In the Netherlands September 20, 1947

7 Claims. (Cl. 250—20)

This invention relates to mixing circuits in which the mixing stage is preceded by a high-frequency stage and the electrode system provided in the latter comprises a grid, at which the high-frequency signal voltage is active, together with a cathode and an anode which is connected, via an impedance, to the positive terminal of the source of supply, the mixing stage comprising an electrode system which also serves to generate the local oscillations of the oscillator and which comprises a cathode, an anode and at least two intermediate grids.

The object of the invention is to provide such a mixing circuit which operates on the additive principle and in which inter alia radiation of the oscillator frequency by the aerial circuit is minimized and an advantageous signal-to-noise ratio is ensured, whilst image frequencies are suppressed in a very efficacious manner. The invention consists in that the cathodes of the high-frequency system and of the mixing system are connected to one another for high-frequency and earthed through at least a portion of a circuit tuned to the signal oscillations, whilst between two grids of the mixing system, one of which is positively biassed, is provided a feed-back such that the local oscillations are generated.

Preferably, the cathodes of the two said systems are both connected to a tapping of the circuit tuned to the signal oscillations.

The invention will be explained more fully by reference to the accompanying drawing showing one example of a mixing circuit according thereto.

In this example the incoming oscillations are active across the aerial circuit 1 whence they are transferred inductively to the circuit 2 tuned to the signal oscillations and of which one point is connected to the control grid 5 of a high-frequency amplifying tube 3 which further comprises a cathode 4 and an anode 6. The latter is connected, via a resistance 7, to the positive terminal of the source of supply and earthed via a decoupling condenser 8 having a low impedance for high-frequency currents. Another point of the high-frequency circuit 2 is also connected to earth. The cathode 4 of the high-frequency amplifier 3 is directly connected to the cathode 9 of the oscillator, which serves also as a mixing tube 3'. The junction of the two cathodes is connected to a tapping on the inductance of a circuit 16 which is likewise tuned to the high-frequency signal oscillations and the lower point of which is earthed for high-frequency.

The tube 3' further comprises a first control grid 10, a grid 11 serving as an oscillator anode, a negatively polarised control grid 12, a grid 13, which is directly connected to the grid 11, a suppressor grid 14 which is connected in the usual manner to the cathode 9, and an anode 15. A point of the circuit 16 is earthed through a resistance 18. The condenser 19 constitutes a path of low impedance for the amplified high-frequency oscillations generated in the circuit 16. The oscillator grid 10 is connected, via a blocking condenser, to a coil 20 which is inductively coupled to a circuit 21 which is adapted to be tuned to the desired local oscillations of the oscillator by means of a condenser. This condenser will, as a rule, be mechanically coupled to the tuning condensers of the circuits 2 and 16, the condenser 22 ensuring in known manner that a constant difference frequency is maintained throughout the tuning range. The top end of the circuit 21 is connected, via a condenser 23, to the interconnected grids 11 and 13 which are connected, via a resistance 24, to the positive terminal of the source of supply. Between the electrodes 11 and 10, via the inductive feed-back coupling 20, 21, is provided a reaction such that oscillations of the local frequency are generated in the circuit 21. The anode circuit of the tube 3' includes a circuit 28 which is invariably tuned to the intermediate frequency and which is inductively coupled to a circuit 29, likewise tuned to the intermediate frequency, and which constitutes an intermediate-frequency bandpass filter therewith. The volume control is effected by means of the grids 5 and 12 to which a control voltage is supplied via a lead 27, the grid 12 being connected to the common point of resistances 25 and 26 included between the lead 27 and earth.

In the circuit as shown the incoming oscillation is active between the cathode 9 of the mixing tube 3' and earth, whilst a voltage of the oscillator frequency is set up at the grid 10 and the cathode 9. The grid 10 is connected via a grid leak resistance to the bottom point of the circuit 16 and a resistance 18 serves to provide a suitable bias for the grid 5. In the tube 3' occurs a so-called additative mixture during which process oscillations of the intermediate frequency are produced in the circuit 28, which oscillations are transferred in the usual manner, via the circuit 29, to the portion of the circuit which is not shown.

Owing to the fact that the coupling between the oscillatory circuit 21 and the input circuit 2 via the electrode capacities is very small, the oscillations of oscillator frequency are substantially not radiated by the aerial circuit. A further advantageous property of the circuit is that image frequencies do not substantially become manifest as troublesome, which is mainly due to the fact that provision is made of two high-frequency circuits tuned to the desired signal frequency. The volume control at two grids in the circuit shown has the advantageous effect that the frequency shift by the control is negligible since the frequency shift caused by the control at one grid counteracts that caused by the control at the other grid, so that a compensating action ensues. The circuit 16 included in the cathode lead does not substantially result in intermediate frequency feedback since the impedance of the portion of the circuit provided between the cathode and earth is but very small for intermediate frequency oscillations so that the conversion amplification is not decreased thereby. For the oscillations of oscillator frequency the said impedance is also small so that the presence of the circuit 16 does not substantially impair oscillation and causes little radiation by the aerial circuit.

The high-frequency system and the mixing and oscillator system are preferably provided with a common cathode and housed in a common envelope. This affords the advantage that use may be made of a tube which is already known for the other purposes.

What I claim is:

1. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first and second grid electrodes and an anode electrode, circuit means tuned to the said given frequency and having one end thereof connected to a point at ground potential, means to couple said cathodes together and to connect the same to an intermediate point in said circuit means, regenerative feedback means intercoupling said first and second grid electrodes to produce local oscillations in said second electron discharge tube system whereby a beat frequency wave is developed therein, and means to derive the beat frequency wave from the said second tube system.

2. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first and second grid electrodes and an anode electrode, circuit means tuned to the said given frequency and having one end thereof connected to a point at ground potential and being provided with an intermediate tapping, means to couple said cathodes together and to connect the same to said tapping of said circuit means, regenerative feedback means intercoupling said first and second grid electrodes to produce local oscillations in said second electron discharge tube system whereby a beat frequency wave is developed therein, and means to derive the beat frequency wave from the said second tube system.

3. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first and second grid electrodes and an anode electrode, circuit means tuned to the said given frequency and having one end thereof connected to a point at ground potential, means to couple said cathodes together and to connect the same to an intermediate point in said circuit means, regenerative feedback means intercoupling said first and second grid electrodes to produce local oscillations in said second electron discharge tube system whereby a beat frequency wave is developed therein, and tuned circuit means coupled to the anode electrode of said second tube system to derive the beat frequency wave from the said second tube system.

4. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first, second and third grid electrodes and an anode electrode, circuit means tuned to the said given frequency and having one end thereof connected to a point at ground potential, means to couple said cathodes together and to connect the same to an intermediate point in said circuit means, regenerative feedback means intercoupling said first and second grid electrodes to produce local oscillations in said second electron discharge tube system whereby a beat frequency wave is developed therein, means to derive the beat frequency wave from the said second tube system, and means to apply a control voltage to the said third grid electrode.

5. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first, second and third grid electrodes and an anode electrode, circuit means tuned to the said given frequency and having one end thereof connected to a point at ground potential, means to couple said cathodes together to connect the same to an intermediate point in said circuit means, regenerative feedback means intercoupling said first and second grid electrodes to produce local oscillations in said second electron discharge tube system whereby a beat frequency wave is developed therein, means to derive the beat frequency wave from the said second tube system, and means to apply a control voltage to the grid electrode of said first tube system and to the said third grid electrode.

6. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first, second, third, fourth and fifth grid electrodes and an anode electrode, circuit means tuned to the said given frequency and having one end thereof connected to a point at ground potential, means to couple said cathodes together and to connect the same to an intermediate point in said circuit means, inductive means coupling the said first and second grid electrodes in regenerative feedback relationship to produce local oscillations in said second electron discharge tube system whereby a beat frequency wave is developed therein, means to connect said fourth grid to said second grid, means to connect said fifth grid to the cathode of said second tube system, tuned circuit means coupled to the anode electrode of said second tube system to derive the beat frequency wave from the said second tube system, and means to apply a control potential to the said third grid electrode.

7. A mixing circuit arrangement comprising, a first electron discharge tube system having a cathode electrode element, a grid electrode and an anode electrode, means to apply a positive potential to the said anode electrode, means to apply a signal voltage of given frequency to the said grid electrode, a second electron discharge tube system having a cathode electrode element, first and second grid electrodes and an anode electrode, circuit means tuned to the said given frequency and having one end thereof connected to a point at ground potential, means to couple said cathodes together and to connect the same to an intermediate point in said circuit means, regenerative feedback means intercoupling said first and second grid electrodes to produce local oscillations in said second electron discharge tube system whereby a beat frequency wave is developed therein, and means to derive the beat frequency wave from the said second tube system, said cathode electrode elements constituting a common cathode member and a common envelope enclosing said tube systems.

PIETER DANIEL VAN DER KNAAP.

REFERENCES CITED

The following references are of record in the file of this patent:

UNITED STATES PATENTS

| Number | Name | Date |
|---|---|---|
| 2,051,177 | Rath | Aug. 18, 1936 |
| 2,393,971 | Busignies | Feb. 5, 1946 |
| 2,476,803 | Booth | July 19, 1949 |

FOREIGN PATENTS

| Number | Country | Date |
|---|---|---|
| 793,353 | France | Jan. 23, 1936 |